Aug. 2, 1966  R. W. MAYHEW ETAL  3,264,080
METHOD FOR FORMING RECTANGULAR FACE PLATE
Original Filed April 18, 1960  4 Sheets-Sheet 1
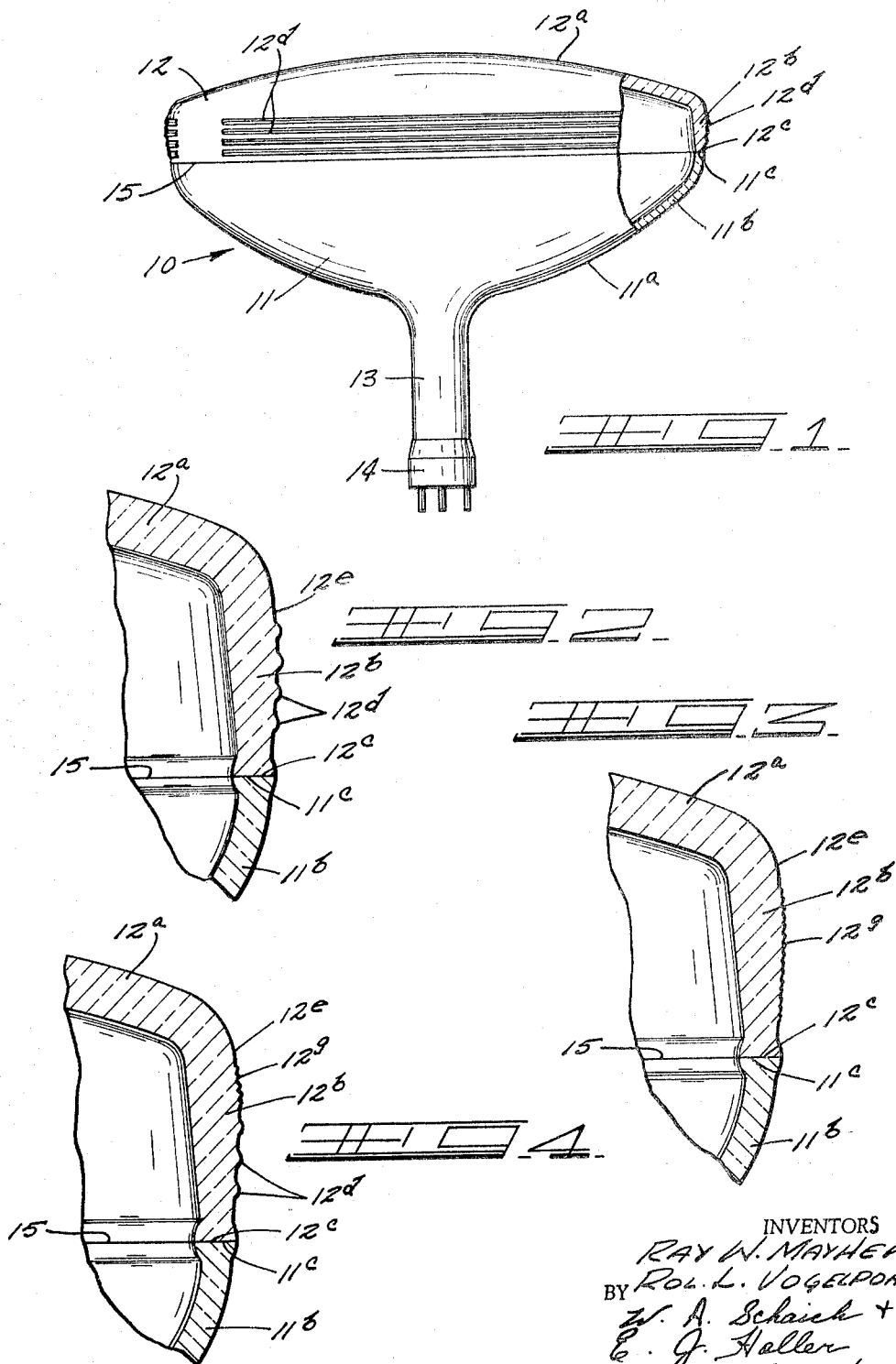
INVENTORS
RAY W. MAYHEW
BY ROL. L. VOGELPOHL
W. A. Schaick +
E. J. Heller
ATTORNEYS Aug. 2, 1966 R. W. MAYHEW ETAL 3,264,080
METHOD FOR FORMING RECTANGULAR FACE PLATE
Original Filed April 18, 1960 4 Sheets-Sheet 2
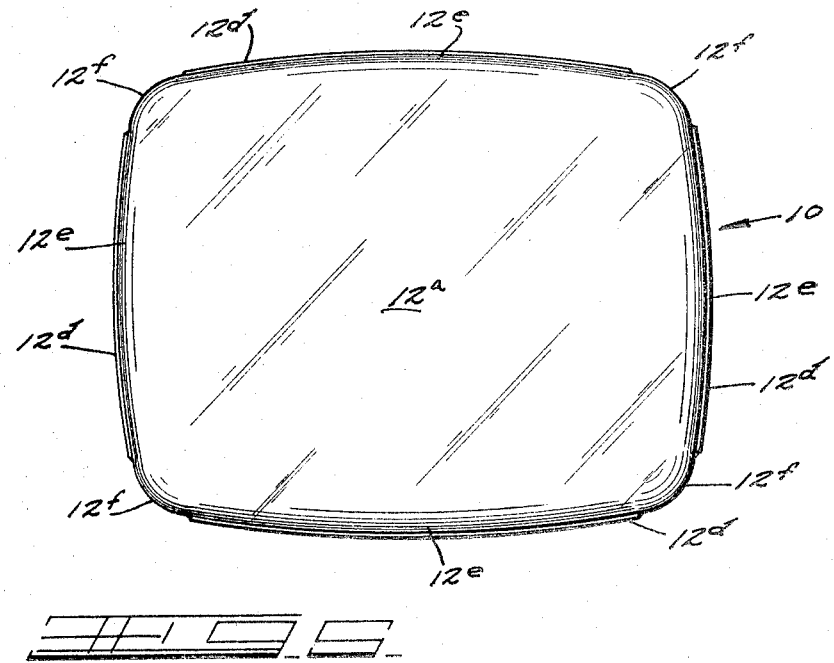
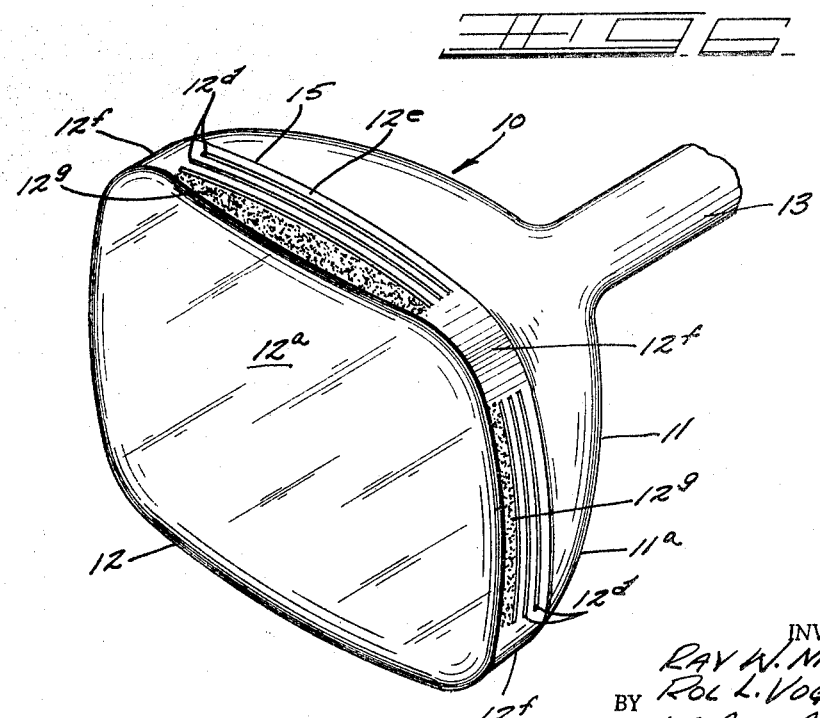
INVENTORS
RAY W. MAYHEW
ROL L. VOGELPOHL
BY
W. A. Schaich &
E. J. Holler
ATTORNEYS Aug. 2, 1966 R. W. MAYHEW ET AL 3,264,080
METHOD FOR FORMING RECTANGULAR FACE PLATE
Original Filed April 18, 1960 4 Sheets-Sheet 3

INVENTORS
RAY W. MAYHEW
BY ROL L. VOGELPOHL
W. A. Schaich &
E. J. Haller
ATTORNEYS Aug. 2, 1966   R. W. MAYHEW ETAL   3,264,080
METHOD FOR FORMING RECTANGULAR FACE PLATE
Original Filed April 18, 1960   4 Sheets-Sheet 4

INVENTORS
RAY W. MAYHEW
BY ROL L. VOGELPOHL
W. A. Schaich &
E. J. Holler
ATTORNEYS

United States Patent Office 3,264,080
Patented August 2, 1966

3,264,080
METHOD FOR FORMING RECTANGULAR FACE PLATE
Ray W. Mayhew and Rol L. Vogelpohl, Columbus, Ohio, assignors to Owens-Illinois Inc, a corporation of Ohio
Original application Apr. 18, 1960, Ser. No. 22,865, now Patent No. 3,071,280, dated Jan. 1, 1963. Divided and this application Apr. 19, 1962, Ser. No. 197,809
3 Claims. (Cl. 65—72)

This application is a division of application Serial No. 22,865 filed April 18, 1960 now patent No. 3,071,280 issued Jan. 1, 1963.

This invention relates to improvements in electron discharge tubes of the type suitable for television receivers and more particularly to tubes having essentially all-glass envelopes adapted to recreate both monochromatic and polychromatic television images. The subject invention is especially applicable to cathode-ray tube bulbs which comprise a tubular glass shell having the form of a conical frustum or a four-sided pyramidal frustum.

Previously, it has been the usual practice to construct a hermetically sealed cathode-ray tube envelope having a generally conical shape from composite hollow glass parts having relatively smooth side walls. The tube envelope is formed by sealing an extensive glass face plate to a frusto-conical shaped glass funnel which envelope is subject, when evacuated, to considerable forces on the face plate, funnel and sealing area therebetween. The seal area which is conventionally disposed at a region of the envelope of maximum cross-sectional dimensions, in addition to maintaining durable vacuum-tightness, must be capable of withstanding considerable stress, both during processing and handling subsequent to face plate sealing as well as when the tube is fully fabricated and placed in service. The seal area and the adjacent region of maximum dimensions must be equally strong both when evacuated and when equalized atmospheric pressure is present both interiorly and exteriorly of the envelope to avoid tube failure.

The tube face plate is normally curvilinear or concavo-convex in contour over its viewing panel. The face plate panel is surrounded by an annular rim of flange which terminates in a sealing surface complemental to the large end of the tube funnel. The face plate on completion of sealing to the funnel and evacuating the envelope is under inward radial compression tending to bow-out or distend the side walls in the seal area. These forces tend to establish undesirable tensile stresses thereat. In the case of frusto-conical tubes having a circular viewing panel at the large end, the tensile stresses normally exist parallel to the tube axis in an annular pattern around the face plate flange and seal area. In frusto-pyramidal tubes having a rectangular viewing panel whose length-to-width ratio is approximately 5:4, the corner areas usually exhibit diminished stresses while the interconnecting flattened sides are stressed in tension in a pattern normal to the tube axis. It is this area in rectangular tubes which is markedly conducive to breakage and must be properly reinforced, particularly in tube envelopes having more nearly square corners such as the recently-developed 23 diagonal inch 114° yoke-angle picture tube.

The ability of both the face plate and funnel to resist the considerable loading placed thereon when the tube is vacuumized must be designed into the envelope structure to satisfactorily resist tube failure due to both thermal and physical shock. The loading forces exerted on the face plate viewing panel in addition to other areas of the tube envelope tend to cause the tube to implode on failure and it is against this tendency that the face plate and funnel side walls must be properly strengthened.

Heretofore, strengthening of such members has been attained by incorporating greater thickness into the tube envelope side walls at areas of possible weakness. However, exterior surfaces of the tube envelope especially at areas of maximum cross-sectional dimensions may become scarred or scratched during processing or handling prior to placing the tube in service. Such imperfections in large tube envelopes such as 21 and 23 diagonal inch sizes of rectangular tubes can be and are objectionally detrimental in durable long-lived tubes. Strengthening of large cross-sectional areas of the envelope by increasing the wall dimensions is objectionable in that it adds substantially to the overall weight of the tube. This form of strengthening has not been fully satisfactory when utilized at maximum peripheral areas of the face plate and/or funnel members and has achieved only limited success in resisting tube failures when exterior surfaces of highly-stressed areas are gently and smoothly contoured. These smooth surfaces are subject to scratching which is frequently self-propagating in lines of weakness disposed perpendicular or angularly to the direction of tensile stresses in the glass side walls.

Some designs of smoothly-curved rectangularly-shaped glass envelopes have shown that as the viewing panel is given a more definitely pronounced rectangular shape, the flattened side walls adjacent thereto have localized areas of weakness which are highly subject to damage. This is in contradistinction to the corner areas which then have relatively short radii. Such corners due to their increased three-dimensional shape in section are more advantageous for resisting damage than corner areas having considerably greater radii. Problems of inherent weakness due to the geometry of these flattened sides and other areas which are highly-stressed in evacuated all-glass envelopes are overcome by the present invention.

Accordingly, it is an object of the present invention to provide an improved cathode-ray tube envelope fabricated of sealed hollow glass parts which envelope is substantially reinforced at its area of maximum cross-sectional dimensions.

Another object of the present invention is to provide an essentially all-glass cathode-ray tube envelope having a rectangular viewing panel, the envelope having an improved resistance to exterior damage at its highly-stressed regions under normal conditions of processing and use.

Another object of this invention is to provide an improved all-glass type enclosure for a cathode-ray television picture tube which is substantially more resistant to exterior surface abrasion and thermal and physical shock at its maximum dimensions adjacent its viewing area at both normal and evacuated pressures.

A still further object of this invention is to provide a generally rectangular cathode-ray picture tube envelope having a discontinuous roughened contour over exterior surfaces of its side walls in highly-stressed condition to minimize and prevent adverse effects thereupon during the life of the tube. This is of particular advantage in the area of the tube envelope where the surface stresses induced by evacuation are relatively high.

A still further object of this invention is to provide an all-glass cathode-ray tube envelope having scratch-resistant exterior surfaces on its flattened sides of extensive dimensions adjacent its viewing portion to minimize and prevent the formation and propagation of objectionable side wall-weaking scores or scratches. Also long scores or scratches, particularly if deep, will tend to open up (propagate) over long periods under very low stress to result in ultimate breakage of the tube.

A still further object of the present invention is to provide a novel method of molding a rectangular face plate of a cathode-ray picture tube envelope having a discontinuous roughened surface projecting annularly and exteriorly of its flattened side surfaces.

Other objects to the invention and the precise nature thereof will appear more fully hereinafter.

On the accompanying drawings:

FIG. 1 is a side elevational view partly in section of an all-glass rectangular cathode-ray tube envelope embodying face plate and funnel members in accordance with our invention.

FIG. 2 is an enlarged fragmentary vertical sectional view of one portion of FIG. 1 at a region of maximum cross-sectional dimensions of the tube envelope.

FIG. 3 is a view similar to FIG. 2 illustrating a modification of the present invention.

FIG. 4 is a view similar to FIG. 2 illustrating another modification of the invention.

FIG. 5 is a plan view of the rectangular tube envelope shown in FIG. 1.

FIG. 6 is a perspective view of the tube envelope shown in FIGS. 1 and 5.

Figure 7:
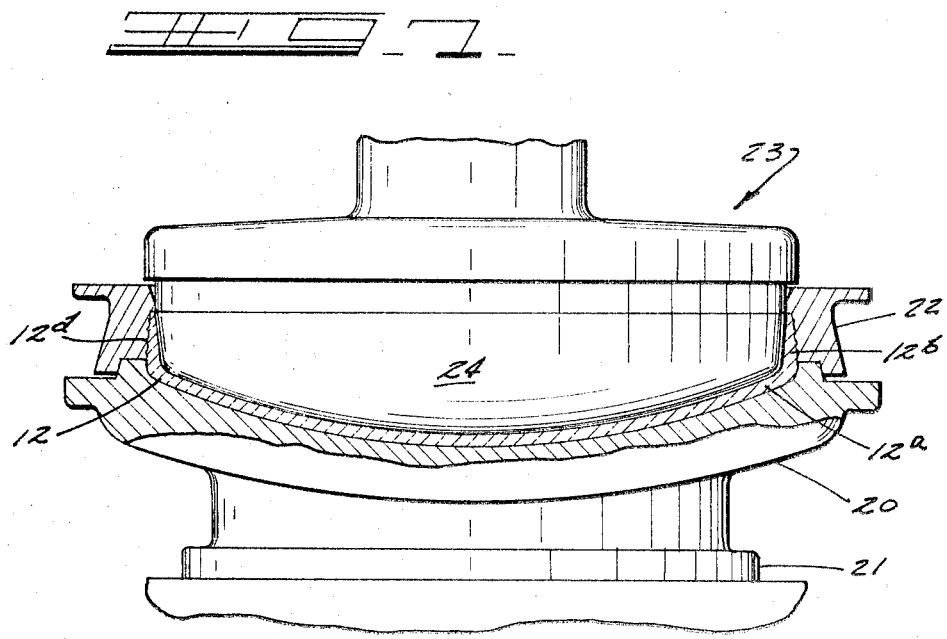
FIG. 7 is a side elevational view partly in section showing press-molding apparatus in cooperative arrangement for forming the face place member of the subject rectangular tube envelope.

While this invention will be described hereinafter as specifically applied to the manufacture of a cathode-ray tube envelope, it will be apparent to those skilled in the art that the principles of the invention are equally applicable to the manufacture of any type of evacuated glass envelope formed by assembly of two or more preformed hollow glass parts having side walls of extensive dimensions subject to highly-stressed conditions when evacuated.

Referring now to the drawings in detail, a glass cathode-ray tube in a preferred embodiment has an envelope 10 which comprises a glass funnel 11 having the shape of a truncated cone to the large end of which is sealed a glass face plate 12. A tubular glass neck 13 is sealed to the other or small end of funnel 11 which is shown as a four-sided pyramidal frustum in FIGS. 1, 5, 6 and 7. A single or multiple electron beam gun structure 14 of any known construction is sealed to the terminating end of neck 13 directed toward a luminescent screen (not shown) of the tube envelope. The luminescent screen is disposed either adjacent to or directly on the interior of the viewing surface of face plate 12. The tube neck, electron gun and screen portions are all well known in the electron discharge tube art and not the subject of the present invention, but are referred to as comprising essential elements of a monochromatic or polychromatic television picture tube.

As shown in FIG. 1, face plate 12 consists of a concavo-convex viewing panel 12a in its central portion which is surrounded by an integral annular peripheral rim or flange 12b terminating in a planar sealing surface 12c. Face plate 12 is adapted to transmit light generated within the envelope and forming recreated images on its viewing panel 12a.

Funnel 11 consists of a frusto-pyramidal shaped main body portion 11a having a generally rectangular integral flange portion 11b at its large end. Flange 11b terminates in a planar sealing surface 11c at an area of maximum cross-sectional dimensions of the funnel. The sealing surfaces 11c and 12c of the funnel and face plate respectively are of complemental planar configuration for uniting either by hermetic welding or fusing along the sealing line 15. Sealing surfaces 11c and 12c are joined either by direct glass-to-glass fusion or by an annular layer of low-melting glass sealing composition (not shown) interposed therebetween. Such low-melting sealant will normally facilitate sealing the component glass parts below their annealing and softening point temperatures without detrimental deformation or distortion thereof, or adversely affecting internal working components such as a color-controlling mask or grid of a polychromatic picture tube.

Annular flange 12b of the face plate 12 which is normally rectangular in a preferred embodiment of the present invention (FIG. 5) has opposing flattened sides 12e which are interconnected by corners 12f having relatively sharp radii. In accordance with the present invention the corners 12f have smooth exterior surfaces while the slightly curvilinear flattened sides 12e have a roughened contour consisting of a plurality of co-parallel ribs 12d formed thereon. As shown in FIGS. 1 and 2 a series of four outwardly and radially projecting similar ribs 12d are shown on the exterior surface of flange 12b on the flattened sides 12e of the annular flange. Ribs 12d are thus positioned at an area of maximum cross-sectional dimensions of the tube envelope overlying areas where maximum tensile stresses frequently exist in the tube side walls. Ribs 12d serve as scratch interrupters where these extensive exterior surfaces are occasionally marked or harshly abraded when contacted by and moved with respect to sharp or ragged metallic elements for example. The crown portions of ribs 12d become marked while the root portions which are protected thereby remain unmarked. Within the flattened sides of the subject rectangular face plate flange, the tensile stresses usually extend normal to the tube axis. Scratches which occur in the direction of tube axis as well as angularly thereto have shown that the ribs prevent the formation of continuous linearly-projecting exterior checks or fissures which are highly detrimental to the life of the tube. The ribs 12d are applied to the areas more highly subject to damage as when the tube envelope is held in processing jigs or rests upon conveying mechanism. The massiveness of the face plate produces a center of gravity of the envelope which is adjacent the seal line so that the envelope is frequently handled by apparatus which grasps or contacts side surfaces of greatest dimensions.

In a modification of the present invention (FIG. 3) flange 12b is provided with a stippled exterior surface 12g having an irregularly indented pebbled contour. The stippled surface 12g extends between the seal area and the corner region interconnecting flange 12b and viewing panel 12a at least over the flattened side surfaces 12e of the flange. Stippled surface 12g provides a discontinuous roughened surface which is well adapted to scratch interruption to prevent the formation and propagation of continuous weakening scratches or surface marks when formed in any direction. Such scratches can proceed into the interior of the flange 12b under the prevailing stress conditions causing destruction of the evacuated envelope.

In another modification of the invention (FIG. 4) the combination of both a series of co-parallel ribs 12d and a stippled surface 12g is provided on the exterior of flange 12b. This form of discontinuous roughened contour similarly extends over at least the flattened sides 12e of the annular flange in a pattern normal to the tube axis. A face plate 12 having the combined stippled and ribbed exterior surface over the flat sides of flange 12b is shown in perspective in FIG. 6. Ribs 12d extend co-parallel adjacent the seal line 15 while the stippled area 12g extends between the ribs 12d and the corner of the viewing panel 12a.

The discontinuous roughened surface over the exterior of the face plate flange 12b facilitates handling and mounting of the tube envelope in bracketing assembly for completion of the tube. Where a separate implosion panel (not shown) having a contour complemental to the viewing panel 12a and a surrounding flange is laminated to the tube face plate, the roughened exterior surface facilitates such lamination and subsequent mounting of the tube within a receiver cabinet.

FIG. 5 illustrates in a plan view the plurality of ribs 12d disposed exteriorly on opposing flattened sides 12e of the face plate flange. The ribs extend essentially coextensive with the flattened sidewalls 12e to adjacent the corner areas 12f. The corners have essentially smooth corners in a preferred embodiment since little or no strengthening thereof is required.

In the method of forming the face plate member 12 having a generally rectangular contour such as that shown in FIGS. 5 and 6, a charge of molten glass is introduced into a hollow mold cavity complemental to the external configuration of the face plate (FIG. 7). Mold 20 is supported by base 21 and has a concavo-convex central portion and an upwardly and outwardly extending shoulder portion on which is positioned a mold shell ring 22. Shell ring 22 is adapted to forming the external surfaces of the face plate flange when a vertically reciprocatable press plunger 23 having a forming head 24 is moved downwardly into cooperative relation with the mold cavity. The body mold 20 and shell ring 22 conjunctively form the mold cavity. The charge of molten glass is pressed to fill the voids within the molding cavity to form the completed face plate. Shell ring 22 has an irreguarly contoured inner surface comprising a series of annular recesses adapted to form the plurality of ribs 12d on the face plate flange. The indented recesses of the shell ring extend around the flattened sides thereof complemental to flattened sides 12e of the face plate while the corner regions of the shell ring are smoothly contoured internally.

After press plunger 23 is employed to press form the charge to the irregularities of the mold cavity to form the face plate, the press plunger is retracted from the mold leaving the newly-formed article resting within the mold cavity. The flattened sides 12e of the face plate flange are then formed with the plurality of co-parallel ribs 12d. The newly-formed face plate 12 is permitted to cool within the combined mold and shell ring for a sufficient period to allow the glass to at least partially set into final form. At this time the flattened side walls 12e contract slightly inwardly by differential contraction relative to the mold to separate the complementally indented surfaces of shell ring 22 and the plurality of ribs 12d. After such separation of these surfaces and when the article is sufficiently cooled, the shell ring 22 is raised above the mold 20 and the newly-formed article is removed therefrom.

It has been found that when the irregularly indented surfaces of the mold shell ring extend around the corner regions having relatively short radii, separation of the molding and molded surfaces is not obtained to permit expedient separation of the molding elements and the newly-formed article. The present invention takes advantage of the slight inward contraction of the flattened curvilinear sides of the hollow article to permit its removal from the mold without damage or loss of production.

Figure 8:
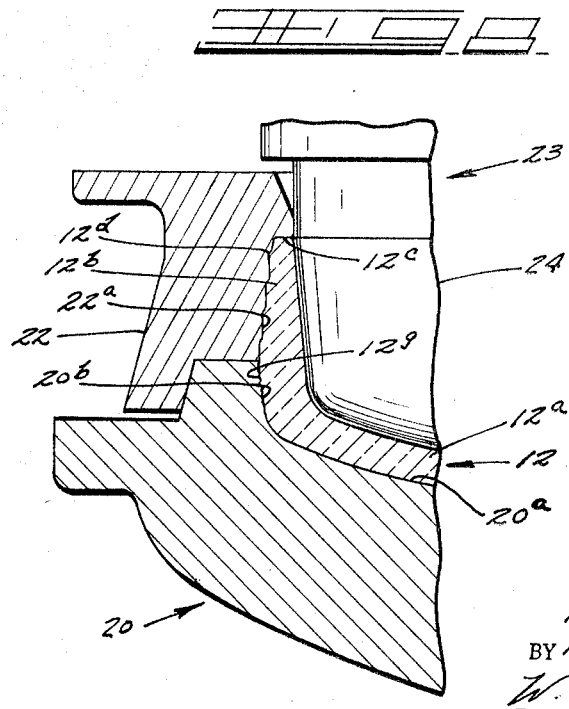
FIG. 8 is an enlarged fragmentary vertical sectional view of the press-molding apparatus shown in FIG. 7 illustrating the formation of the peripheral flange portion of the tube face plate.

As shown in FIG. 8 where combined ribs 12d and stippling 12g are formed on the exterior surfaces of flattened sides 12e, the upwardly extending annular shoulder 20b of mold 20 has an irregularly-indented stippled surface formed therein extending adjacent the intersecting corner of viewing panel 12a and flange 12b. In this modification the rectangular face plate is press formed having the combined stippled and ribbed exterior surface as shown in FIG. 4.

Figure 9:
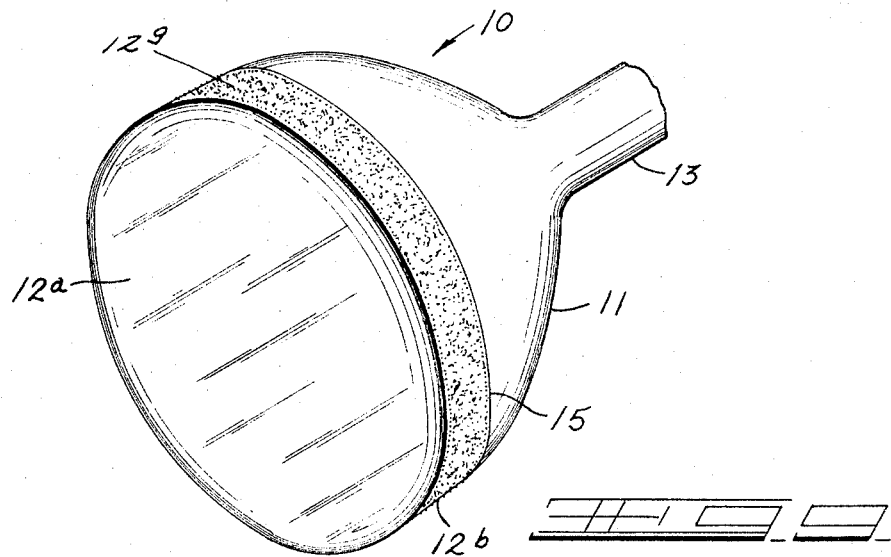
FIG. 9 is a perspective view of a circular cathode-ray tube illustrating another modification of the invention.
Figure 10:
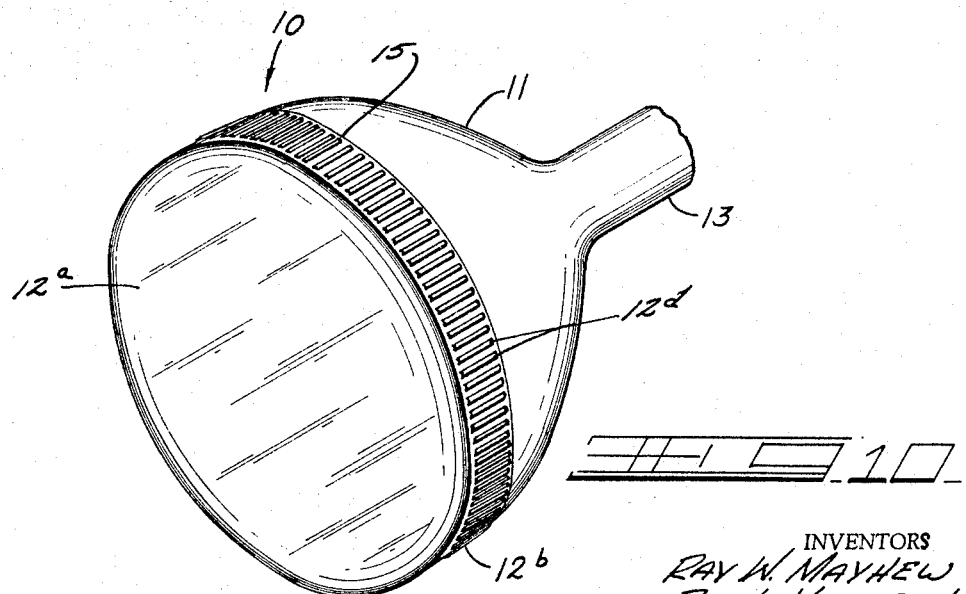
FIG. 10 is a view similar to FIG. 9 illustrating a still further modification of the invention.

As shown in FIG. 9 a stippled exterior surface 12g having an irregularly indented contour is provided on the outer region of the circular flange of a frusto-conical tube envelope 10a. In this type of envelope tensile stresses in the face plate flange extend parallel to the tube axis. The pebbly external surface which extends in a continuous annular band around the flange is resistant to scratching or surface marking which can endanger the life of the tube. As shown in FIG. 10 since the tensile stresses exist parallel to the tube axis, a plurality of short ribs 12d are applied parallel to the tube axis to resist scratching at an angle thereto. The ribs 12d extend between the seal line 15 and the corner of the viewing panel 12a in an annular band around the flange.

Pressure tests of rectangular bulbs such as the 23 diagonal inch 114° beam angle bulb have shown that the exterior surfaces of the flattened side walls at the area of maximum dimensions are highly prone to exterior injury i.e. as by scratching or where a localized condition of "reboil" occurs at the seal area, thus presenting a region subject to failure. It has been shown by such pressure tests that the strength of conventional and recently designed bulbs having highly-stressed areas can be increased in the order of about 10% by the scratch interrupting roughened exterior contours. Tests of such bulbs which have broken predominantly by weakness in the long and short flattened sides have shown that an increase in strength to more than the three times atmospheric pressure or 44 p.s.i. is obtainable by the present invention. It has been found that the bulbs are substantially resistant to breakage by surface abrasion, accidental scratching or sealing line "reboil" where the roughened exterior contours are applied. "Reboil" is usually a localized condition which may be produced in the seal area during thermal fusion of the parent glass edges into a fused joint, the seal exhibiting a series of voids beneath the glass surface.

Various other modifications may be resorted to within the spirit and scope of the appended claims.

What is claimed is:

1. The method of forming a hollow rectangular glass face plate of a cathode ray television picture tube envelope, said face plate having a concavo-convex light-transmitting viewing screen portion and flaring, outwardly-convex non-viewing sidewalls integral with and surrounding said screen portion, the exterior surfaces of said sidewalls adjacent said screen portion of essentially maximum cross-sectional dimensions having a juxtaposed series of integral projections extending at least partially around the flattened sidewalls surrounding said screen portion, comprising the steps of introducing a charge of molten glass into a mold cavity having a configuration complemental to the external configuration of said viewing portion and sidewalls of said face plate and having a specific rate of contraction in the glass cooling temperature range, press forming said charge of molten glass into intimate contact with the bottom and sidewalls of said cavity and cooling said pressed glass while maintaining said glass in said cavity for a period of time sufficient to at least partially set said glass in its pressed, shaped form and to permit the flattened sidewalls of the shaped glass to move inwardly by differential contraction relative to the mold side walls to separate said sidewalls from the complemental wall surfaces of said cavity a distance sufficient to permit the juxtaposed series of integral projections formed in said sidewalls of said face plate to clear the walls of said cavity, and removing said formed face plate from said cavity without said projections contacting the walls of said cavity.

2. The method of forming a hollow glass face plate of a cathode ray television picture tube envelope or the like comprising the steps of introducing a charge of molten glass into a hollow mold having a generally concave region surrounded by upwardly extending side walls defining a hollow mold cavity, the upwardly extending side walls of said mold cavity having a number of internal recesses lying completely within the mold cavity side walls and spaced from the open end of the mold, the mold side walls having a specific rate of contraction in the glass cooling temperature range, projecting a reciprocable press plunger into said mold cavity to press form the charge of molten glass within said mold cavity to form the face plate, retracting said press plunger from said mold cavity, cooling the newly formed face plate until portions of the face plate move out of said recesses by differential contraction relative to the mold side walls, and removing the newly formed face plate from the mold cavity in a direction along the axis of the mold cavity while at the same time maintaining the mold intact.

3. The method of forming a hollow glass face plate for a cathode ray television picture tube envelope comprising the steps of introducing a charge of molten glass into a mold cavity defined by a body mold having a generally concave central region and by a separable shell ring coaxially mounted on said body mold to define the side walls of the mold cavity, said shell ring having a number of recesses on the internal annular surface thereof with said recesses being spaced from the end of the shell ring opposite the body mold, the shell ring having a specific rate of contraction in the glass cooling temperature range, projecting a reciprocable press plunger into said mold cavity to press form said charge to form the face plate, retracting said press plunger from said mold cavity, cooling the newly formed face plate until face plate rib portions formed in said recesses move out of said recesses by differential contraction relative to the shell ring, removing said shell ring from said newly formed face plate in the direction of said axes and subsequently removing the face plate from said body mold while maintaining said body mold intact.

References Cited by the Examiner

UNITED STATES PATENTS

| 300,691 | 6/1884 | Brown | 65—365 X |
| 655,728 | 8/1900 | Mygatt | 65—365 X |
| 1,274,577 | 8/1918 | Moorshead | 65—72 |
| 1,527,947 | 2/1925 | Woods | 65—365 X |
| 1,627,884 | 5/1927 | Bristol | 65—72 |
| 2,840,954 | 7/1958 | Ramsey | 65—307 |
| 2,931,141 | 4/1960 | Mayhem et al. | 65—77 |

DONALL H. SYLVESTER, *Primary Examiner.*

F. W. MIGA, *Assistant Examiner.*